Dec. 31, 1935.    H. TRAMM    2,025,916
METHOD OF PRODUCING FERTILIZERS
Original Filed Feb. 11, 1931
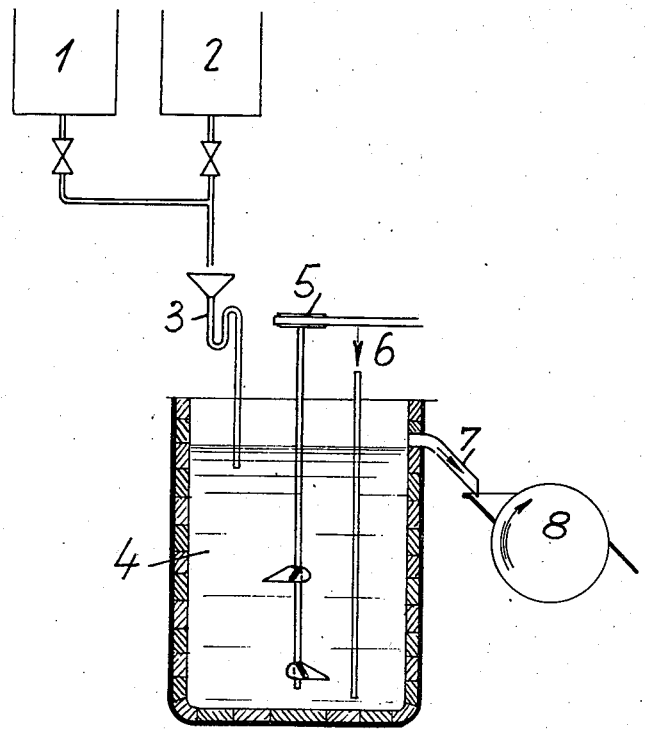
Inventor
H. Tramm
by
W. E. Evans:
Attorney.

Patented Dec. 31, 1935

2,025,916

UNITED STATES PATENT OFFICE 2,025,916

METHOD OF PRODUCING FERTILIZERS

Heinrich Tramm, Oberhausen-Holten, Germany, assignor to Ruhrchemie Aktiengesellschaft, Oberhausen-Holten, Germany Original application February 11, 1931, Serial No. 515,124. Divided and this application January 22, 1932, Serial No. 588,241. In Germany September 2, 1930

13 Claims. (Cl. 71—9)

It is known to produce together mixed fertilizers containing ammonium nitrate and ammonium phosphate which may also contain further substances adapted to serve as fertilizers. For this purpose, ammonia is fed into a mixture of nitric acid and phosphoric acid in the manner of a saturator process. The great reaction and solution heat of the ammonia produces the evaporation of a considerable part of the water introduced by way of the acids or of all the water.

It is important that the ammonia should decompose with the acid mixture with a weakly alkaline, neutral or weakly acid reaction. The concentration of all the free acid in the vessel is maintained as far as possible below 5%. A mixture of ammonium phosphate and ammonium nitrate is formed continuously, the acids being introduced in the proportions required by the reaction. By regulating the temperature and the pressure over the saturator vessel, the process may be so carried out that both ammonium nitrate and ammonium phosphate are separated out in solid form and that there is a component in solution or in melted condition. According to the nature of the work the removal from the saturator is effected by open or throttled overflow pipes or by other suitable means. The solid salt mixture may be obtained either when working in solution, by centrifugal or similar means, or working in a melt by allowing solidification of the mixture issuing from the saturator to take place. It has been found advantageous to draw off from the saturator at definite zones having a particularly suitable salt composition. The formation of such zones can be assisted by means of a controlled circulation in the saturator, which may be produced by an agitator or the like.

Furthermore, the water may be vaporized in two stages if so desired. In this case the main part of the water is vaporized in the supply vessel. The mixture may then be drawn off continuously or intermittently, for example through an overflow pipe or by tapping, into a vessel, advantageously smaller, in which, if required, the remainder of the water is removed by additional heating and if necessary by the introduction of further ammonia. The ammonia introduced serves to neutralize any free acid or acidic salts that may be present, so that thus it is a simple matter to produce a substance having the desired reaction. Furthermore, this method of procedure has the advantage that it results in the presence of ammonium phosphate of any desired composition or an ammonium phosphate mixture in the final product. It will be understood that the hereinbefore mentioned measure may be employed for producing a melt which contains separated out parts in suspension. This process has special advantages for the production of raw products for mixed fertilizers which contain the most important fertilizer components namely, nitrogen, phosphorus and potassium. The mixture of ammonium nitrate and ammonium phosphate obtained is in this case mixed with potassium salts to form a product that can be used immediately. Such a product can be obtained by adding to the raw acid for producing the mixture of ammonium phosphate and ammonium nitrate, a suitable potassium salt such as potassium sulphate. The products obtained in the manner hereinbefore described have a good capacity for storage and distribution by reason of the common separation of ammonium phosphate and ammonium nitrate which separation results in a stronger chain of molecules of the two compounds.

The following is an example of the application of the process according to the invention, reference being made to the accompanying diagrammatic drawing illustrating the saturator vessel in section:—

A 210 litre iron tank 4, lined with bricks and provided with a stirring device 5, and also having an overflow 7, contains about 210 kg. of a melt at 117° consisting of 76.8 kg. of diammonium phosphate, 118.5 kg. of ammonium nitrate and 14.7 kg. of water. Into this apparatus 6.06 litres of a 50% nitric acid of specific gravity 1.316, and 1.4 litres of a 84% phosphoric acid of specific gravity 1.73 are passed from the vessels 1 and 2 through the siphon 3 every hour. During this time 2 kg. of ammonia (equal to 2.82 cubic metres of gas) are added through the pipe 6 in a state of atomization. The contents of the vessel are maintained thoroughly mixed by the stirring device 5. The temperature in the saturator remains when not heated at 117°. Every hour 8.75 kg. of salt are produced consisting of 3.20 kg. of diammonium phosphate 4.95 kg. of ammonium nitrate and 0.60 kg. of water. This product flows off through the overflow 7 and is caused to solidify on the cooling roller 8.

This case is a division of application Serial No. 515,124, filed February 11, 1931.

I claim:

1. A process for the continuous production of mixed fertilizers containing ammonium nitrate and ammonium phosphate from ammonia, nitric acid and phosphoric acid, consisting in feeding the initial components into a melt of ammonium nitrate produced during the reaction and containing ammonium phosphate in solid form and by suitable selection of the concentrations of the initial components as well as the working temperatures and with the practically complete evaporation of the water introduced with the reaction components through the heat of reaction and dissolution, maintaining during the process a melt of determined character, withdrawing said melt from the reaction vessel and cooling it to convert it directly into a solid salt.

2. A process for the continuous production of mixed fertilizers containing ammonium nitrate and ammonium phosphate from ammonia, nitric acid and phosphoric acid, consisting in feeding the initial components into a melt of ammonium nitrate produced during the reaction and containing ammonium nitrate and ammonium phosphate in solid form, and by suitable selection of the concentrations of the initial components as well as the working temperatures and with practically complete evaporation of the water introduced with the reaction components through the heat of reaction and dissolution, maintaining during the process a melt of determined character, withdrawing said melt from the reaction vessel and cooling it to convert it directly into a solid salt.

3. A process for the continuous production of mixed fertilizers containing ammonium nitrate and ammonium phosphate from ammonia, nitric acid and phosphoric acid, consisting in feeding the initial components into a melt of ammonium nitrate produced during the reaction and containing ammonium phosphate and other fertilizer salts in solid form and by suitable selection of the concentrations of the initial components as well as the working temperatures and with the practically complete evaporation of the water introduced with the reaction components through the heat of reaction and dissolution, maintaining during the process a melt of determined character, withdrawing said melt from the reaction vessel and cooling it to convert it directly into a solid salt.

4. A process for the continuous production of mixed fertilizers containing ammonium nitrate and ammonium phosphate from ammonia, nitric acid and phosphoric acid, consisting in feeding the initial components into a melt of ammonium nitrate produced during the reaction and containing ammonium phosphate in solid form, and by suitable selection of the concentrations of the initial substances as well as the working temperatures by the use of the reaction and dissolution heat and additional heat, with the practically complete evaporation of the water introduced with the reaction components, maintaining during the process a melt of determined character, withdrawing said melt from the reaction vessel and cooling it to convert it directly into a solid salt.

5. A process according to claim 1, consisting in producing the melt in a reaction vessel provided with a mechanical stirring device and maintaining an energetic circulation of the melt by means of the said device.

6. A process according to claim 1, comprising the step of drawing off the ammonium nitrate melt containing solid ammonium phosphate from the reaction vessel by an overflow pipe.

7. A process for the continuous production of mixed fertilizers containing ammonium nitrate and ammonium phosphate from ammonia, nitric acid and phosphoric acid, consisting in feeding into a reaction vessel the initial components into a melt of ammonium nitrate produced during the reaction and containing the ammonium phosphate in solid form, and producing a lye while suitably regulating the concentration of the initial components and the working temperatures, the said lye containing a certain quantity of the water, that is to be completely evaporated, transferring the reaction mass to a second vessel, introducing ammonia into the said vessel and effecting the evaporation of the residual water by the heat of reaction and dissolution of the ammonia.

8. In a process according to claim 7, maintaining the reaction mixture as it issues from the reaction vessel, with a content of 5% water to be evaporated.

9. In a process according to claim 7, evaporating the remaining water in the second vessel by external heating.

10. The process of producing mixed fertilizers which comprises simultaneously introducing nitric acid, phosphoric acid, a fertilizing potassium salt and ammonia into a melt comprising a reaction product of nitric acid, phosphoric acid and ammonia in such proportions as to continuously maintain a from slightly acid to neutral reaction in the melt.

11. The process of producing a mixed fertilizer which comprises simultaneously introducing nitric acid, phosphoric acid and ammonia into a melt comprising a reaction product of nitric acid, phosphoric acid and ammonia in such proportions as to continuously maintain a from slightly acid to neutral reaction in the melt.

12. The process of producing mixed fertilizers which comprises simultaneously introducing nitric acid, phosphoric acid, a fertilizing potassium salt and ammonia into a melt comprising a reaction product of nitric acid, phosphoric acid and ammonia in such proportions as to continuously maintain a from slightly acid to neutral reaction in the melt, the acids being of such concentration that by the heat of neutralization the water content of the melt is reduced to such a value that the melt solidifies upon cooling the normal temperature.

13. The process of producing a mixed fertilizer which comprises simultaneously introducing nitric acid, phosphoric acid and ammonia into a melt comprising a reaction product of nitric acid, phosphoric acid and ammonia in such proportions as to continuously maintain a from slightly acid to neutral reaction in the melt, the acids being of such concentration that by the heat of neutralization the water content of the melt is reduced to such a value that the melt solidifies upon cooling to normal temperature.

HEINRICH TRAMM.